(12) United States Patent
Ott

(10) Patent No.: US 6,899,808 B1
(45) Date of Patent: May 31, 2005

(54) SYSTEM FOR PROCESSING POLLUTED WATER

(76) Inventor: Chris Ott, 2308 Bollinger Crest, San Ramon, CA (US) 94583

( * ) Notice: Subject to any disclaimer, the term of this patent is extended or adjusted under 35 U.S.C. 154(b) by 183 days.

(21) Appl. No.: 10/246,555

(22) Filed: Sep. 19, 2002

(51) Int. Cl.[7] .............................. B01D 21/02
(52) U.S. Cl. ..................... 210/241; 210/305; 210/522; 210/532.1
(58) Field of Search ................. 210/299, 521, 210/522, 532.1, 305, 241

(56) References Cited

U.S. PATENT DOCUMENTS

| | | | |
|---|---|---|---|
| 1,902,171 A | | 3/1933 | Kopp |
| 2,782,929 A | * | 2/1957 | Colket ..................... 210/532.1 |
| 2,852,140 A | | 9/1958 | Mac Laren |
| 3,425,913 A | * | 2/1969 | Holden ....................... 210/521 |
| 3,460,677 A | | 8/1969 | Fifer |
| 3,463,172 A | * | 8/1969 | Naylor ....................... 210/521 |
| 3,574,329 A | | 4/1971 | Beavon |
| 4,128,833 A | * | 12/1978 | Tsavaris .................... 210/521 |
| 4,157,969 A | * | 6/1979 | Thies ........................ 210/521 |
| 4,278,545 A | | 7/1981 | Batutis et al. |
| 4,333,835 A | | 6/1982 | Lynch |
| 4,997,562 A | | 3/1991 | Warner |
| 5,248,439 A | * | 9/1993 | Derrell ....................... 210/522 |
| 5,266,191 A | | 11/1993 | Greene et al. |
| 5,344,255 A | | 9/1994 | Toor |
| 5,445,730 A | | 8/1995 | Pattee |
| 5,458,770 A | * | 10/1995 | Fentz ......................... 210/521 |
| 5,503,753 A | * | 4/1996 | Woodall et al. .......... 210/532.1 |
| 5,626,748 A | | 5/1997 | Rose |
| 6,077,448 A | | 6/2000 | Tran-Quoc-Nam |

FOREIGN PATENT DOCUMENTS

| | | |
|---|---|---|
| WO | WO 88/06478 | 9/1988 |
| WO | WO 93/12896 | 7/1993 |

* cited by examiner

*Primary Examiner*—Christopher Upton
(74) *Attorney, Agent, or Firm*—Theodore J. Bielen, Jr.

(57) ABSTRACT

A system for processing polluted water utilizing a first container having an inlet for receiving polluted water and a third container having an outlet for treated water. A second container is also employed and lies between the first container and a third container. A pair of partitions separate the first and second containers and the second and third containers. The first partition includes a weir, which is transversely offset from another weir found in the second partition. The third container includes filters for particulate matter and oil products.

14 Claims, 3 Drawing Sheets

SYSTEM FOR PROCESSING POLLUTED WATER

BACKGROUND OF THE INVENTION

The present invention relates to a novel and useful system for processing polluted water.

Water which is contaminated with oil and slurry material is often encountered during construction work, for example, deep trench excavation, deep pit excavation, highway construction, well drilling, and the like. In addition, water from storms flowing over construction sites again results in water which is contaminated with silt and oils. Removal of these contaminants or pollutants is generally referred to as "dewatering".

In the past, fouled water had been removed from construction sites, transported to a treatment plant, and treated with conventional methods and equipment. Although successful in purifying the water for release to a drainage system, such methods are expensive and time consuming. In the past, many methods have been devised to treat dirty water. For example, U.S. Pat. No. 1,902,171 shows a septic tank which utilizes three chambers separated by strainers to filter solid sewage.

U.S. Pat. Nos. 4,278,545, 4,333,835, and 5,445,730 detail multi-chambered containers in which vertical plates are employed to separate solids from liquid contaminants.

U.S. Pat Nos. 2,852,140 and 4,997,562 describe treatment tanks in which contaminated water flows from one tank to another and gradually settles out solid contaminants, leaving pure water to be decanted from the tank.

PCT Publication WO88/06478, U.S. Pat. No. 5,266,191, and U.S. Pat. No. 5,626,748 describe liquid separators in which baffles or plates are employed to coalesce oil and remove solid matter at the same time.

U.S. Pat. No. 5,344,255 and PCT Publication WO93/12896 describe an oil, water, and sand separator which employs screening and a biodegradable detergent to emulsify oil for separation from the original mixture.

U.S. Pat. No. 3,574,329 illustrates a process for purifying water containing oil and solids in which a filter media, such as sand, is used. The sand is periodically cleaned by application of steam.

U.S. Pat. No. 3,460,677 shows a transportable sewage treatment apparatus in which baffles are used to stabilize the mixture process and permit the activation of the sewage by bacterial components.

U.S. Pat. No. 6,077,448 shows an oil/grit interceptor in which multi chambered tanks are used to treat the fluid rain water. The chamber is used to either separate oil from the water or grit from the water.

A system for processing polluted water which is portable and reliable would be a notable advance in the environmental control of contaminated water.

BRIEF SUMMARY OF THE INVENTION

In accordance with the present invention a novel and useful system for processing polluted water to remove solid and liquid contaminants is herein provided.

The system of the present invention utilizes a first container. The first container possesses a bottom and an inlet for receiving the polluted water. A wall portion extends outwardly from the bottom to form an endless wall which terminates in a rim.

A second container is positioned adjacent the first container. Again, the second container includes a bottom with a wall portion extending outwardly from the bottom and terminating in a rim. The first and second containers possess a common transverse dimension.

A first partition extends from the vicinity of the bottom of the first and second containers. The first partition is formed with a weir to allow passage of water from the first container to the second container. In addition, should the polluted water contain any oil contaminants, such contaminants would also pass through the weir. The first weir is located closer to the rim of the first container than the bottom of the same.

A third container is positioned adjacent the second container and is formed with a bottom and a wall portion extending outwardly. The wall portion of the third container terminates in a rim. An outlet is found in the third container for treated water. A second partition extends from the vicinity of the bottoms of the second and third containers and is formed with a second weir to allow passage of water from the second container to the adjacent third container. The first weir is spaced from the second weir along the common transverse dimension of the first and second containers. The third container may also be included as having a common transverse dimension with the first and second containers. In general, the walls of the first, second and third containers may be contiguous. In addition, the system of the present invention including the first, second and third containers may be a portable unit easily transported to a construction site for use.

Filter means is employed in the third container for filtering the water of solids and oils. The inlet to the first container may be transversely spaced form the outlet of the third container. This feature, in combination with the offsetting of the weirs, maximizes the resident time of the polluted water in the three containers of the present system. This aspect promotes the deposition of sediment and the separation of oil from the contaminated or polluted water.

The system of the present invention further includes water bypasses through the first and second partitions. Each of the bypasses may include a conduit having a terminus which directs the water passing through the first and second partitions in an upward direction so as not to disturb sediment at the bottom of the first, second and third containers. In addition, the bypasses aid in the coalescing of oil droplets at the upper most surface of the water body within the first, second and third containers of the system of the present invention.

It may be apparent that a novel and useful system for treating dirty or contaminated water has been described.

It is therefore an object of the present invention to provide a system for treating contaminated water which is capable of separating solids and oils from water in a simple and efficient manner.

It is another object of the present invention to provide a system for treating contaminated water which is easily constructed and maintained.

Another object of the present invention is to provide a system for treating contaminated water which receives water runoff from the construction site and discharges water which may be passed to a storm drain, creek, or other waterway following treatment by the system of the present invention.

Yet another object of the present invention is to provide a system for treating for contaminated water which possesses a relatively high capacity and uses a minimum of moving parts.

Figure 1:
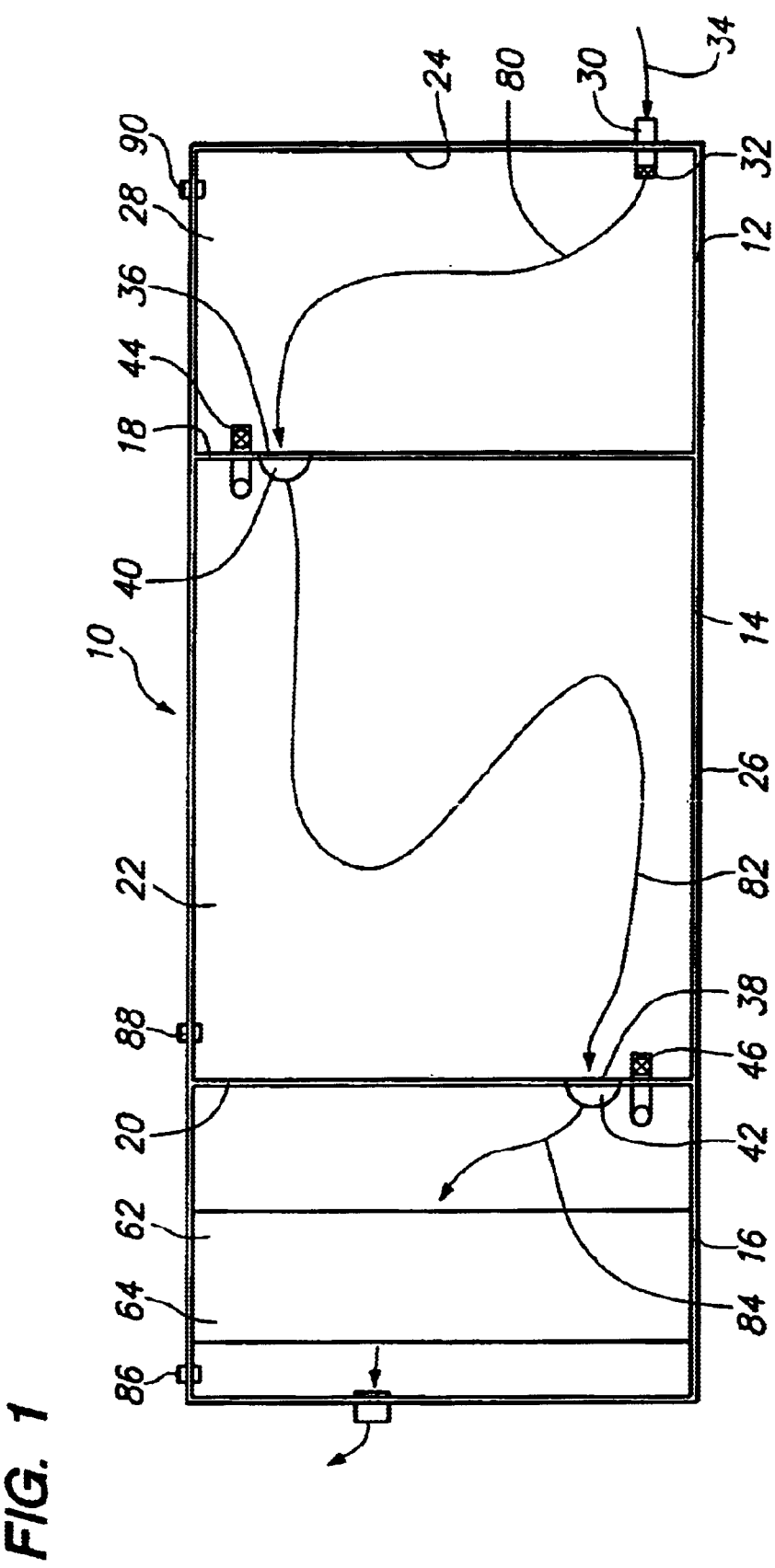
FIG. 1 is a top plan view of the system of the present invention.

For a better understanding of the invention reference is made to the following detailed description of the preferred embodiments thereof which should be taken in conjunction with the prior described drawings.

DETAILED DESCRIPTION OF THE PREFERRED EMBODIMENTS OF THE INVENTION

Various aspects of the present invention will evolve from the following detailed description of the preferred embodiments thereof which should be taken in conjunction with the prior delineated drawings.

The invention as a whole is shown in the drawings by reference character 10. System 10 includes as one of its elements, first, second, and third containers 12, 14, and 16. Containers 12, 14, and 16 may be formed of any rigid or semi-rigid materials such as metal, plastics, ceramics, and the like. First, second and third containers 12, 14, and 16 are formed by partitions 18 and 20. Partitions 18 and 20 extend from bottom 22 of containers 12, 14, and 16 and span endless wall 24 which extends upwardly from bottom 22. Rim 26 serves as the terminus for wall 24. Containers 12, 14, and 16 may take the form of a unitary or contiguous structure easily transported by heavy equipment.

First container 12 possesses a chamber 28 which receives contaminated water through an inlet 30. Inlet 30 takes the form of a conduit having a diffuser 32 in the form of a screen. Diffuser 32 disperses the water-entering inlet 30 and also collects large debris to prevent passage of the same through containers 12, 14, and 16. Inlet 30 may possess a valve (not shown) to control the flow of water into system 10. Directional arrow 34 indicates the flow of polluted or contaminated water into system 10 through inlet 30.

Figure 3:
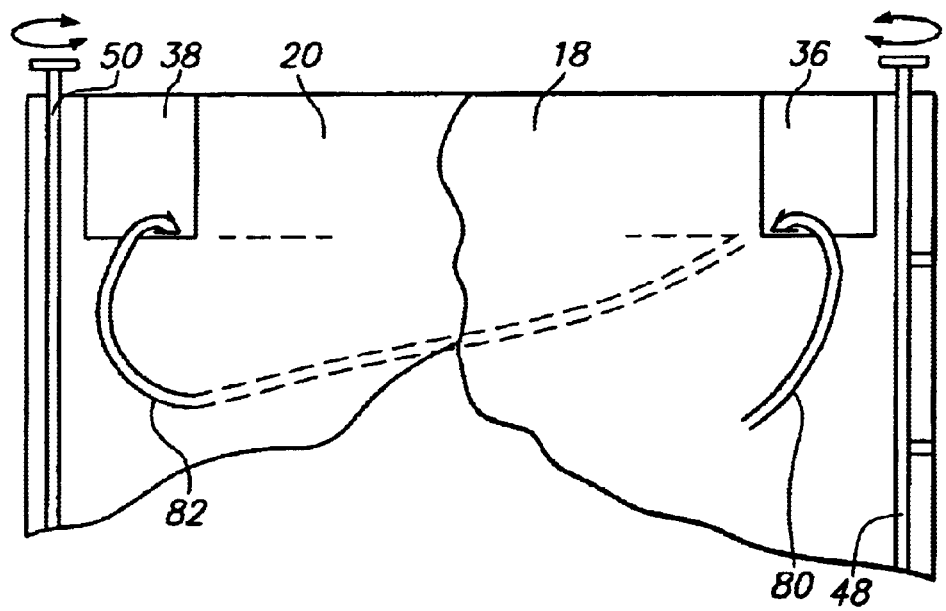
FIG. 3 is a partial end view of the partitions forming the first, second and third containers of the system of the present invention and directional arrows illustrating the flow of liquids through the weirs.

With reference to FIGS. 1 and 3 it may be observed that partitions 18 and 20 are formed with weirs 36 and 38. Weirs or slots 36 and 38 permit the passage of liquid, normally oil and water through the top portion of partitions 18 and 20, respectively. Weir 36 is slightly higher than weir 38 to promote flow through system 10. Splash plates 40 and 42 direct liquid flowing through weirs 36 and 38 outwardly to prevent the stirring of sediment which normally lies at the bottom of containers 12, 14, and 16 as soon as treatment of contaminated water progresses.

Figure 2:
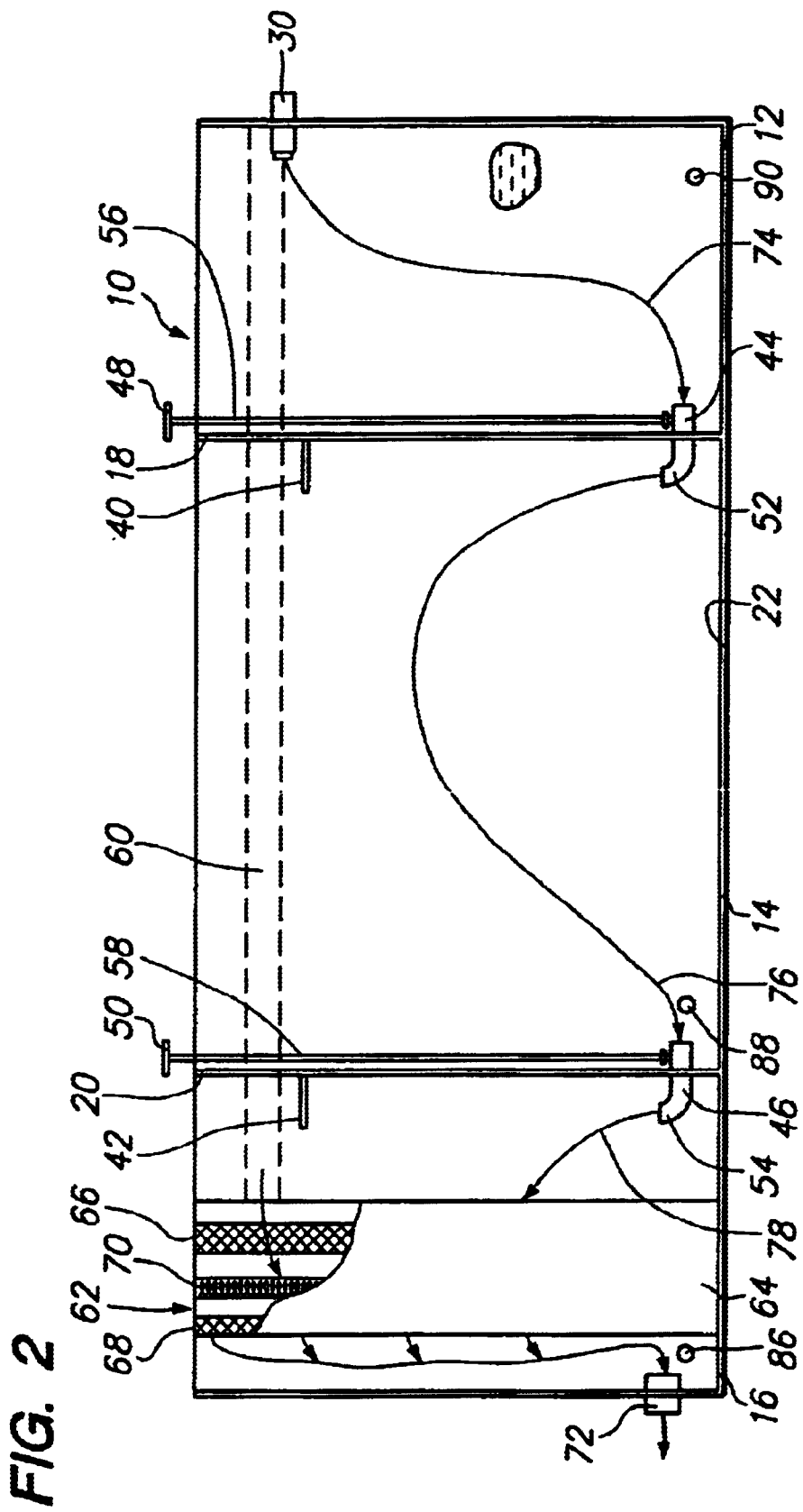
FIG. 2 is a side elevational view of the system of the present invention with a vertical wall removed along the length thereof and a portion of the filter system shown in broken configuration.
Figure 4:
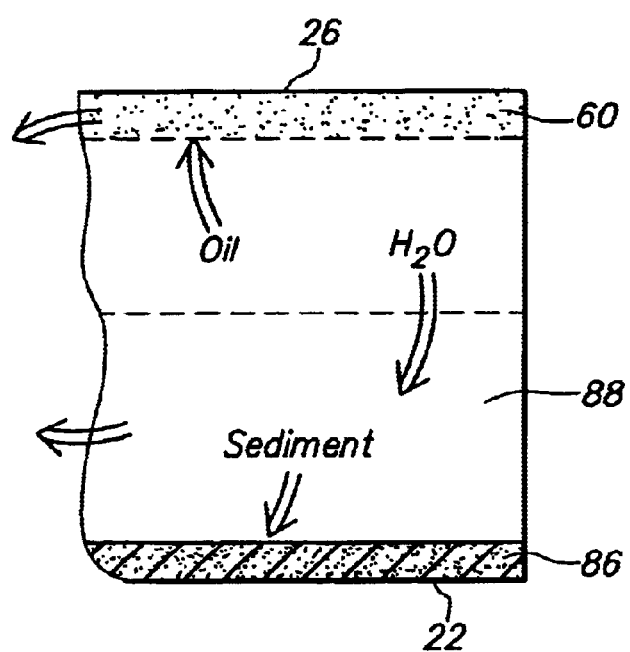
FIG. 4 is a schematic sectional view depicting the separation of solid and oil components of contaminated water in the system of the present invention.

With reference to FIGS. 1, 2, and 4, it may be seen that system 10 may be utilized to separate solids and oil from the contaminated water stream entering inlet 30, directional arrow 34. In this regard, bypasses 44 and 46 allow water to pass through partitions 18 and 20. Bypasses 44 and 46 include valves 48 and 50 which control the flow of water through partitions 18 and 20, respectively. Termini 52 and 54 of bypasses 44 and 46, respectively, sweep 90 degrees upwardly to direct the flow of water in that direction. Again, such water flow prevents the stirring of sediment on bottom 22 of containers 12, 14, and 16. Valves 48 and 50 are controlled remotely through elongated stems 56 and 58, respectively. Channel or strata 60 (dashed lines on FIG. 2) indicate the zone where oil contaminants will be found when separated from the initial contaminated water stream-entering inlet 30.

Filter means 62 is also found in system 10, specifically in container 16. Filter means 62 is contained in an open support 64 and may house a plurality of mesh screens such as screens 66 and 68. In addition, an absorbent filter 70 may be employed to hold the oil contaminants separated in chambers 12, 14, and 16. Outlet 72 sends water stream to a creek, waterway, or storm drain in its purified form.

In operation, the user directs water into system 10 through inlet 30. The water component follows directional arrows 74, 76, and 78 to filter structure 64, FIG. 2, when bypasses 44 and 46 are open. With reference to FIG. 1, it may be observed that water may flow according to directional arrows 80, 82, and 86 when bypasses 44 and 46 are closed. In actuality, water flows in both directions. However, oil zone 60 accumulating at the top of the liquid found in containers 12, 14, and 16, generally passes through weirs 36 and 38 with some water. Bypass termini 52 and 54 are directed upwardly to prevent the stirring up of sediment at the bottom 22 of system 10. FIG. 4 depicts sediment layer 86 at bottom 22 and oil layer 60 near rim 26 of any one of the containers, 12, 14, or 16 of system 10. Middle zone 88 indicates the separation of water, sediment, and oil in a general manner. After use, remaining water is drained from container 12, 14, and 16 through capped pipes 86, 88, and 90 by opening the same. Sediment layer 22 is then removed by mechanical means.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A system for processing polluted water to remove contaminants, comprising:

a. a first container, said first container possessing an inlet for receiving the polluted water, said first container including a bottom and wall portion extending outwardly therefrom and terminating in a rim;

b. a second container positioned adjacent said first container, said second container including a bottom and a wall portion extending outwardly therefrom, terminating in a rim, said first and second containers having a common transverse dimension;

c. a first partition extending from the vicinity of said bottom of said first and second containers, said first partition including a first weir to allow passage of water from said first container to said second container, said first weir located closer to said rim of said first container than said bottom of said first container;

d. a third container positioned adjacent said second container, said third container including a bottom and a wall portion extending outwardly therefrom and terminating in a rim; said third container including an outlet;

e. a second partition extending from the vicinity of said second and third containers, said second partition including a second weir to allow passage of water from said second container to said adjacent third container, said first weir spaced from said second weir along said common transverse dimension; and f. filter means for filtering the water entering said third container prior to egress through said third container outlet.

2. The system of claim 1 in which said walls of said first, second, and third containers are contiguous.

3. The system of claim 1 in which said common transverse dimension of said first and second containers also comprises a common transverse dimension of said first, second, and third containers.

4. The system of claim 3 in which said inlet to said first container and said outlet from said third container are spaced from each other along said common transverse dimension.

5. The system of claim 4 in which said walls of said first, second, and third containers are contiguous.

6. The system of claim 5 in which said contiguous first, second, and third containers are portable.

7. The system of claim 1 which further comprises a wall bypass through said first partition.

8. The system of claim 7 which further comprises a water bypass through said second partition.

9. The system of claim 8 in which said bypass through said second partition includes a terminus directed away from said bottom of said third container.

10. The system of claim 9 in which said walls of said first, second, and third containers are contiguous.

11. The system of claim 9 in which said common transverse dimension of said first and second containers also comprises a common transverse dimension of said first, second, and third containers.

12. The system of claim 11 in which said inlet to said first container and said outlet from said third container are spaced from each other along said common transverse dimension.

13. The system of claim 12 in which said walls of said first, second, and third containers are contiguous.

14. The system of claim 13 in which said contiguous first, second, and third containers are portable.

* * * * *